(12) United States Patent
Zhang et al.

(10) Patent No.: US 10,419,090 B2
(45) Date of Patent: Sep. 17, 2019

(54) METHOD FOR PRECODING MATRIX INDICATOR FEEDBACK AND APPARATUS

(71) Applicant: HUAWEI TECHNOLOGIES CO., LTD., Shenzhen, Guangdong (CN)

(72) Inventors: Ruiqi Zhang, Beijing (CN); Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/148,296

(22) Filed: Oct. 1, 2018

(65) Prior Publication Data

US 2019/0036580 A1  Jan. 31, 2019

Related U.S. Application Data

(63) Continuation of application No. PCT/CN2016/078298, filed on Apr. 1, 2016.

(51) Int. Cl.
*H04B 7/02* (2018.01)
*H04B 7/0456* (2017.01)
(Continued)

(52) U.S. Cl.
CPC ......... *H04B 7/0478* (2013.01); *H04B 7/0639* (2013.01); *H04B 7/0658* (2013.01); *H04L 1/06* (2013.01); *H04W 84/042* (2013.01)

(58) Field of Classification Search
CPC .......................... H04B 7/0478; H04W 84/042
(Continued)

(56) References Cited

U.S. PATENT DOCUMENTS 8,537,658 B2\* 9/2013 Sayana ............... H04B 7/0663
370/208
2015/0263800 A1   9/2015 Gao et al.
(Continued)

FOREIGN PATENT DOCUMENTS

CN        101877684 A    11/2010
CN        103746779 A     4/2014
(Continued)

OTHER PUBLICATIONS

United States Office Action issued in U.S. Appl. No. 16/248,344 dated Feb. 15, 2019, 20 pages.
(Continued)

*Primary Examiner* — Dhaval V Patel
(74) *Attorney, Agent, or Firm* — Fish & Richardson P.C.

(57) ABSTRACT

A method and apparatus for precoding matrix indicator feedback reduce a quantity of bits in the feedback. In the method, a terminal device receive a reference signal from a base station, determines a precoding matrix W in a precoding matrix set corresponding to a rank indication. W satisfies $W=W_1 \times W_2 \times W_3$, $W_1$, $W_2$ and $W_3$ and matrices and respectively corresponding to a first, second and third precoding matrix indicator. None of $W_1$, $W_2$, and $W_3$ is an identity matrix, and the 2M columns in $W_1$ comprise every column in $W_1 \times W_2$. The terminal device transmits the rank indication, the first precoding matrix indicator, the second precoding matrix indicator, and the third precoding matrix indicator to the base station. Therefore, a quantity of to-be-selected vectors is reduced by using a first-stage feedback and a second-stage feedback, thereby reducing calculation complexity of third-stage feedback, and reducing a quantity of bits in the third-stage feedback.

14 Claims, 5 Drawing Sheets

(51) Int. Cl.
*H04L 1/06* (2006.01)
*H04B 7/06* (2006.01)
*H04W 84/04* (2009.01)

(58) Field of Classification Search
USPC ....... 375/260, 262, 265, 267, 295, 316, 340, 375/343, 346; 370/203, 204, 208, 209
See application file for complete search history.

(56) References Cited

U.S. PATENT DOCUMENTS

2017/0366981 A1* 12/2017 Takano ................ H04W 16/28
2018/0069613 A1*  3/2018 Li ............................ H04B 7/06
2018/0316398 A1* 11/2018 Wernersson ......... H04B 7/0469

FOREIGN PATENT DOCUMENTS

| CN | 103780331 A | 5/2014 |
| EP | 2985921 A1 | 2/2016 |

OTHER PUBLICATIONS

R1-153817 Alcatel-Lucent et al.,"Proposals of 2D Codebook Design for 3D MIMO",3GPP TSG RAN WG1 Meeting #82,Beijing, China, Aug. 24-28, 2015,total 8 pages.
R1-153939 CATT,"Codebook structure for FD-MIMO",3GPP TSG RAN WG1 Meeting #82, Beijing, China, Aug. 24-28, 2015,total 6 pages.
R1-153407 Samsung,"Specification impacts and evaluation results with linear-combination",3GPP TSG RAN WG1 Meeting #81,Fukuoka, Japan, May 25-29, 2015,total 4 pages.
3GPP TS 36.213 V13.1.1 (Mar. 2016), 3rd Generation Partnership Project;Technical specification Group Radio Access Network;Evolved Universal Terrestrial Radio Access (E-UTRA);Physical layer procedures(Release 13), Mar. 2016. total 361 pages.
International Search Report and Written Opinion issued in International Application No. PCT/CN2016/078298 dated Jan. 4, 2017, 22 pages.
Extended European Search Report issued in European Application No. 16896061.5 dated Mar. 29, 2019, 8 pages.

* cited by examiner

Coverage space of $W_1$

METHOD FOR PRECODING MATRIX INDICATOR FEEDBACK AND APPARATUS

CROSS-REFERENCE TO RELATED APPLICATION

This application is a continuation of International Application No. PCT/CN2016/078298, filed on Apr. 1, 2016, the disclosure of which is hereby incorporated by reference in its entirety.

TECHNICAL FIELD

This application relates to the mobile communications field, and in particular, to a multiple-antenna technology in a wireless communications system.

BACKGROUND

Multiple-input and multiple-output (MIMO) technologies are widely applied in a Long Term Evolution (LTE) system. A transmitting end may use a precoding technology to process data, so as to improve signal transmission quality or a signal transmission rate. The transmitting end may be a base station or a terminal device.

In the LTE system, a base station obtains a precoding matrix usually in a manner in which a terminal device feeds back a precoding matrix indicator (PMI). A set of used precoding matrices is usually referred to as a codebook or a codebook set. Each precoding matrix in the codebook or the codebook set may also be referred to as a codeword.

The terminal device quantizes channel state information (CSI) and feeds back the CSI to the base station. The base station determines a precoding matrix based on the CSI. CSI information fed back in an existing LTE system includes a rank indication (RI), a PMI, and the like. The RI is used to indicate a quantity of data streams for spatial multiplexing. The PMI is used to indicate a precoding matrix.

An LTE standard supports 8 antenna ports and 16 antenna ports. Currently, a dual-stage codebook feedback mechanism is defined to reduce a quantity of bits of a PMI fed back by a terminal device, so as to reduce load. First-stage feedback indicates a vector group, including four vectors for subsequent processing. One of the four vectors is selected for second-stage feedback, and the selected vector may be used for data precoding. The first-stage feedback has a long period/a wide band characteristics, and the second-stage feedback has a short period/a sub-band characteristics.

Figure 1:
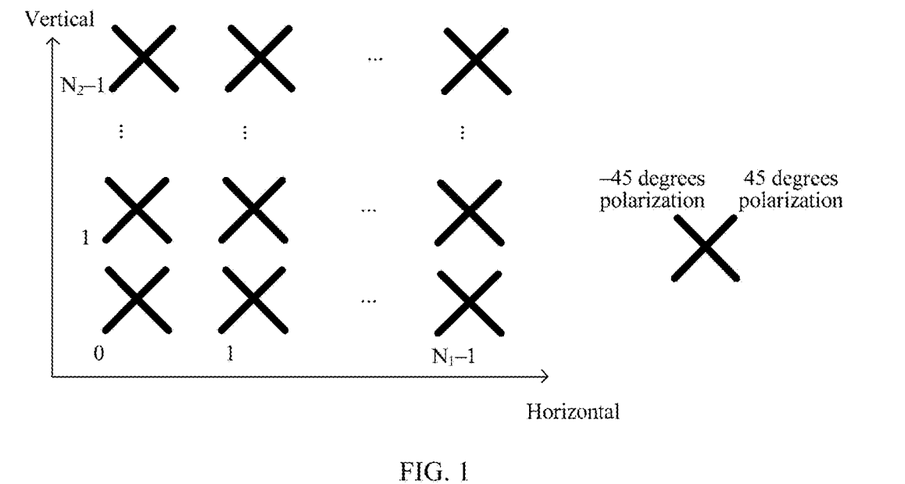
FIG. 1 is a schematic diagram of a two-dimensional antenna array.

FIG. 1 is a schematic diagram of a two-dimensional antenna array. In FIG. 1, an antenna port has 45 degrees polarization and −45 degrees polarization. For a polarization direction, there are $N_1$ antenna ports in a horizontal direction, and there are $N_2$ antenna ports in a vertical direction.

Figure 2A:
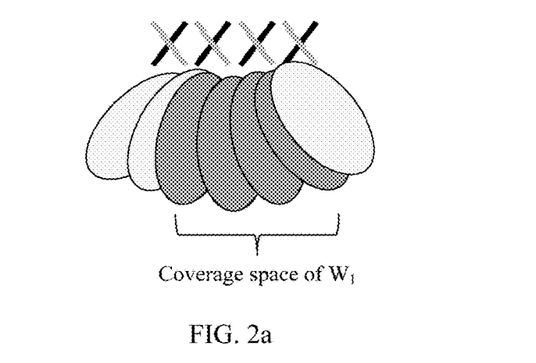
FIG. 2a is a schematic diagram of coverage space of a beam group in a case of 8 antenna ports.
Figure 2B:
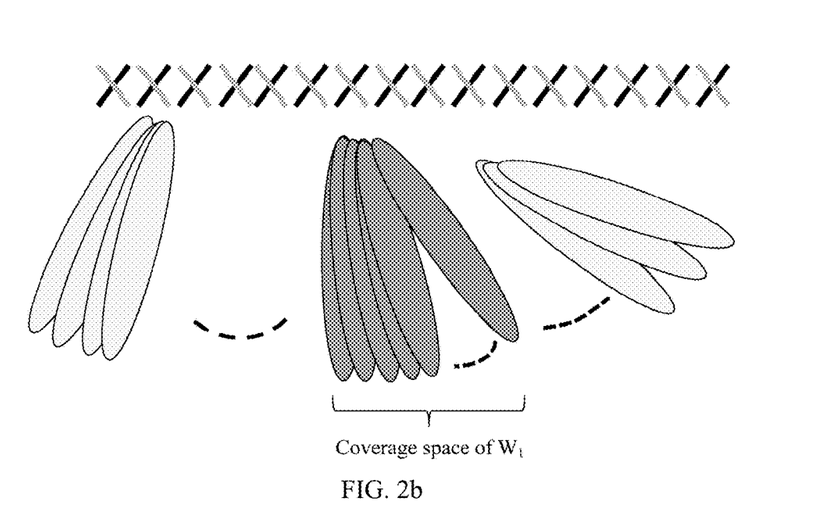
FIG. 2b is a schematic diagram of coverage space of a beam group in a case of 32 antenna ports.

As a quantity of antenna ports increases, a beam width obtained after the base station performs precoding becomes increasingly narrow. To better cover an entire system bandwidth, the vector group in the first-stage feedback needs to include more vectors. For example, for 32 antenna ports, 16 antenna ports are included in each polarization direction. To enable a vector group in first-stage feedback in a system with 32 antenna ports and a vector group in first-stage feedback in a system with 16 antenna ports to have same coverage space, the vector group in the first-stage feedback in the system with the 32 antenna ports needs to include 16 column vectors, as shown in FIG. 2a and FIG. 2b.

In a case of the 32 antenna ports, if the current codebook feedback mechanism is still used, to be specific, the vector group in the first-stage feedback includes four vectors, a coverage bandwidth is inevitably affected, leading to performance degradation of a codebook.

If a quantity of vectors in the first-stage feedback is increased to 16, the 16 vectors need to be used for selection for the second-stage feedback. This increases a quantity of bits in the second-stage feedback, and consequently, increases system overheads of the terminal device.

SUMMARY

This application describes a precoding matrix indicator feedback method and an apparatus, so as to reduce system overheads of a terminal device while satisfying a system performance requirement as much as possible.

According to a first aspect, a precoding matrix determining method is provided. A terminal device determines a precoding matrix W in a precoding matrix set corresponding to a rank indication. W satisfies $W=W_1 \times W_2 \times W_3$, W is a matrix of $N_t$ rows and R columns, $N_t$ is a quantity of antenna ports, R is a rank value corresponding to the rank indication, $N_t$ is greater than or equal to R. $W_1$ is a matrix of $N_t$ rows and 2M columns, $W_2$ is a matrix of 2M rows and 2K columns, $W_3$ is a matrix of 2K rows and R columns, K is less than M. $N_t$, R, M, and K are all positive integers, M is greater than or equal to 2, $N_t$ is an even number, none of $W_1$, $W_2$, and $W_3$ is an identity matrix, and the 2M columns in $W_1$ include every column in $W_1 \times W_2$. A first precoding matrix indicator corresponds to the first precoding matrix $W_1$, a second precoding matrix indicator corresponds to the second precoding matrix $W_2$, and a third precoding matrix indicator corresponds to the third precoding matrix $W_3$. The terminal device transmits the rank indication, the first precoding matrix indicator, the second precoding matrix indicator, and the third precoding matrix indicator to the base station.

A set of columns in $W_1$ include every column in $W_1 \times W_2$. This represents that 2K column vectors are selected from the columns in $W_1$ as a result of $W_1 \times W_2$. In this way, a quantity of vectors in a set of to-be-selected vectors is reduced subsequently, thereby reducing calculation complexity of subsequent processing, and reducing a quantity of bits for feeding back a PMI for selection from candidate vectors.

According to a second aspect, a precoding matrix indicator feedback method is provided. A base station receives a rank indication, a first precoding matrix indicator, a second precoding matrix indicator, and a third precoding matrix indicator a terminal device. The base station determines in a precoding matrix set corresponding to the rank indication, a precoding matrix W based on the first precoding matrix indicator, the second precoding matrix indicator, and the third precoding matrix indicator. W satisfies $W=W_1 \times W_2 \times W_3$, W is a matrix of $N_t$ rows and R columns, $N_t$ is a quantity of antenna ports, R is a rank value corresponding to the rank indication, $N_t$ is greater than or equal to R, $W_1$ is a matrix of $N_t$ rows and 2M columns, $W_2$ is a matrix of 2M rows and 2K columns, $W_3$ is a matrix of 2K rows and R columns, K is less than M, $N_t$, R, M, and K are all positive integers, M is greater than or equal to 2, $N_t$ is an even number, none of $W_1$, $W_2$, and $W_3$ is an identity matrix, and the 2M columns in $W_1$ include every column in $W_1 \times W_2$.

The first precoding matrix indicator corresponds to the first precoding matrix $W_1$, the second precoding matrix indicator corresponds to the second precoding matrix $W_2$, and the third precoding matrix indicator corresponds to the third precoding matrix $W_3$.

According to a third aspect, an embodiment of the present invention provides a terminal device. The terminal device has a function of implementing behaviors of the terminal device in the foregoing method designs. The function may be implemented by hardware, or may be implemented by hardware executing corresponding software. The hardware or the software includes one or more modules corresponding to the foregoing functions. The modules may be software and/or hardware.

The terminal device includes a receiver, a processor and a transmitter. The receiver is configured to receive a reference signal from a base station. The processor is configured to determine a precoding matrix W in a precoding matrix set corresponding to a rank indication. W satisfies $W=W_1 \times W_2 \times W_3$, W is a matrix of $N_t$ rows and R columns, $N_t$ is a quantity of antenna ports, R is a rank value corresponding to the rank indication, $N_t$ is greater than or equal to R. $W_1$ is a matrix of $N_t$ rows and 2M columns, $W_2$ is a matrix of 2M rows and 2K columns, $W_3$ is a matrix of 2K rows and R columns, K is less than M. $N_t$, R, M, and K are all positive integers, M is greater than or equal to 2, $N_t$ is an even number. None of $W_1$, $W_2$, and $W_3$ is an identity matrix, and the 2M columns in $W_1$ include every column in $W_1 \times W_2$. A first precoding matrix indicator corresponds to the first precoding matrix $W_1$, a second precoding matrix indicator corresponds to the second precoding matrix $W_2$, a third precoding matrix indicator corresponds to the third precoding matrix $W_3$.

The transmitter is configured to send the rank indication, the first precoding matrix indicator, the second precoding matrix indicator, and the third precoding matrix indicator to the base station.

Optionally, receiver is configured to receive a configuration parameter sent by the base station.

According to a fourth aspect, an embodiment of the present invention provides a base station. The base station has a function of implementing behaviors of the base station in the foregoing method designs. The function may be implemented by hardware, or may be implemented by hardware executing corresponding software. The hardware or the software includes one or more modules corresponding to the foregoing functions.

The base station includes a receiver and a processor. The receiver is configured to receive a rank indication, a first precoding matrix indicator, a second precoding matrix indicator, and a third precoding matrix indicator tfrom a terminal device. The processor is configured to determine in a precoding matrix set corresponding to the rank indication a precoding matrix W based on the first precoding matrix indicator, the second precoding matrix indicator, and the third precoding matrix indicator. W satisfies $W=W_1 \times W_2 \times W_3$, W is a matrix of $N_t$ rows and R columns, $N_t$ is a quantity of antenna ports, R is a rank value corresponding to the rank indication, $N_t$ is greater than or equal to R. $W_1$ is a matrix of $N_t$ rows and 2M columns, $W_2$ is a matrix of 2M rows and 2K columns, $W_3$ is a matrix of 2K rows and R columns, K is less than M. $N_t$, R, M, and K are all positive integers, M is greater than or equal to 2, $N_t$ is an even number. None of $W_1$, $W_2$, and $W_3$ is an identity matrix, and the 2M columns in $W_1$ include every column in $W_1 \times W_2$. The first precoding matrix indicator corresponds to the first precoding matrix $W_1$, the second precoding matrix indicator corresponds to the second precoding matrix $W_2$, and the third precoding matrix indicator corresponds to the third precoding matrix $W_3$.

Optionally, the base station further includes a transmitter configured to send a configuration parameter.

In the first to the fourth aspects, further, there may be the following optional designs:

Optionally, each precoding matrix W in the precoding matrix set corresponding to the rank indication satisfies $W=W_1 \times W_2 \times W_3$.

Optionally, $W_2$ satisfies $$W_2 = \begin{bmatrix} X_2 & 0 \\ 0 & X_2 \end{bmatrix},$$

$X_2$ is a matrix of M rows and K columns, any column in $X_2$ is represented as $e_p$, $e_p$ is an M×1 column vector, a $p^{th}$ element in $e_p$ is 1, remaining elements are 0, and p is an integer from 1 to M.

Optionally, $W_1$ satisfies $$W_1 = \begin{bmatrix} X_1 & 0 \\ 0 & X_1 \end{bmatrix},$$

$X_1$ is a matrix of $N_t/2$ rows and M columns, $X_1=[v_0 \ldots v_{M-1}]$, $v_o$ is a column vector including $N_t/2$ elements, and o is an integer from 0 to M−1; and Any column in $W_3$ is represented as $$\begin{bmatrix} e_l \\ \phi_n e_l \end{bmatrix},$$

$\phi_n$ is a complex number, $e_l$ is a K×1 column vector, an $l^{th}$ element in $e_l$ is 1, remaining elements are 0, and l is an integer from 1 to K.

Optionally, a frequency domain resource corresponding to the first precoding matrix indicator is a downlink system bandwidth of the terminal device. The downlink system bandwidth includes A first sub-bands and B second sub-bands, A and B are positive integers greater than 1, and A is less than or equal to B.

A frequency domain resource corresponding to the second precoding matrix indicator is one of the A first sub-bands, and a frequency domain resource corresponding to the third precoding matrix indicator is one of the B second sub-bands.

A quantity of column vectors in a vector group corresponding to the first sub-band is less than a quantity of vectors in a vector group corresponding to the system bandwidth. Therefore, a quantity of vectors that need to be searched during vector selection on the second sub-band is reduced, and a quantity of bits required for feeding back an indicator of the selected vector on the second sub-band can be reduced.

Optionally, a frequency domain resource of at least one of the A first sub-bands is the same as frequency domain resources of at least two of the B second sub-bands.

Optionally, frequency domain resources corresponding to the first precoding matrix indicator, the second precoding matrix indicator, and the third precoding matrix indicator are downlink system bandwidths of the terminal device.

Optionally, a transmission period of the first precoding matrix indicator is $P_1$, a transmission period of the second precoding matrix indicator is $P_2$, a transmission period of the third precoding matrix indicator is $P_3$, $P_1$ is greater than or equal to $P_2$, and $P_2$ is greater than or equal to $P_3$.

Optionally, the transmission periods $P_1$, $P_2$, and $P_3$ are sent by the base station to the terminal device through Radio Resource Control (RRC) signaling.

Different transmission periods are configured for different precoding matrix indicators, and are used to correspond to different features of a channel. Some precoding matrix indicators correspond to a part that is of the channel and that varies relatively fast over time, and some precoding matrix indicators correspond to a part that is of the channel and that varies relatively slowly over time. For example, the first precoding matrix indicator corresponds to a part that is of a channel and that varies most slowly over time, the second precoding matrix indicator corresponds to a part that is of the channel and that varies relatively slowly over time, and the third precoding matrix indicator corresponds to a part that is of the channel and that varies relatively fast over time. $P_1$, $P_2$, and $P_3$ are configured based on channel features, so as to reduce a quantity of bits for feeding back a PMI.

Optionally, T column vectors in 2K column vectors in $W_2$ are indicated by the first precoding matrix indicator, T is an integer greater than or equal to 2, and T is less than K; and 2K−T column vectors in $W_2$ except the T column vectors are indicated by the T column vectors and the second precoding matrix indicator. In this way, a quantity of bits required for feeding back the second precoding matrix indicator is reduced.

Optionally, 2K column vectors in $W_2$ are indicated by a configuration parameter delivered by a base station and the second precoding matrix indicator. In this way, a quantity of bits required for feeding back the second precoding matrix indicator is reduced.

Optionally, the configuration parameter is used to indicate a selectable column vector set of $W_1$, the selectable column vector set includes J column vectors, and J satisfies 2K<J<2M.

Optionally, the configuration parameter is a configuration parameter sent by the base station to the terminal device through RRC signaling.

Optionally, X in $W_1$ satisfies $X_1=[v_0^1 \ldots v_{M_1-1}^1] \otimes [v_0^2 \ldots v_{M_2-1}^2]$, where $v_m^1$ is a column vector including $N_1$ elements, $v_n^2$ is a column vector including $N_2$ elements, $N_1 \times N_2 = N_t/2$, $M_1 \times M_2 = M$, and $\otimes$ represents a Kronecker product.

Optionally $X_2$ in $W_2$ satisfies $X_2=X_3 \otimes X_4$, where $X_3$ is a matrix of $M_1$ rows and $K_1$ columns, $X_4$ is a matrix of $M_2$ rows and $K_2$ columns, and $\otimes$ represents a Kronecker product.

Any column in $X_3$ is represented as $e_i$, $e_i$ is an $M_1 \times 1$ column vector, an $i^{th}$ element in $e_i$ is 1, remaining elements are 0, and a value of i is an integer from 1 to $M_1$.

any column in $X_4$ is represented as $e_j$, $e_j$ is an $M_2 \times 1$ column vector, a $j^{th}$ element in $e_j$ is 1, remaining elements are 0, and a value of j is an integer from 1 to $M_2$.

$K_1 \times K_2 = K$, and $M_1 \times M_2 = M$.

In the third and the fourth aspects, the sending unit may be a transmitter, the receiving unit may be a receiver, and the processing unit may be a processor.

An embodiment of the present invention further provides a system. The system includes the terminal device and the base station in the foregoing embodiments.

In this application, feedback (or sending) of the first precoding matrix indicator may be considered as first-stage feedback, feedback of the second precoding matrix indicator may be considered as second-stage feedback, and feedback of the third precoding matrix indicator may be considered as third-stage feedback.

Compared with the prior art, in the solutions provided in this application, feedback of a precoding matrix indicator is classified into three stages. The second-stage feedback is used to indicate some vectors in a vector group indicated by the first-stage feedback. Due to a reduction in a quantity of to-be-selected vectors, system overheads of calculating the third-stage feedback by the terminal are reduced, and a quantity of bits required for the third-stage feedback is reduced, thereby better balancing system performance and feedback overheads of the terminal device.

BRIEF DESCRIPTION OF DRAWINGS

To describe the technical solutions in the embodiments of the present invention more clearly, the following briefly describes the accompanying drawings for describing the embodiments.

DESCRIPTION OF EMBODIMENTS

The technical solutions according to embodiments of the present invention are clearly described in the following with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present invention.

Network architectures and business scenarios described in the embodiments of the present invention aim to more clearly describe the technical solutions in the embodiments of the present invention, but are not intended to limit the technical solutions provided in the embodiments of the present invention. A person of ordinary skill in the art may know that as the network architectures evolve and a new business scenario emerges, the technical solutions provided in the embodiments of the present invention further apply to a similar technical problem.

It should be understood that the technical solutions in the embodiments of the present invention may be applied to various communications systems, for example, a Long Term Evolution (LTE) system, an LTE frequency division duplex (FDD) system, an LTE time division duplex (TDD) communications system, a device to device (D2D) communication, or the like.

It should also be understood that in the embodiments of the present invention, the terminal device (terminal equipment) may be referred to as a terminal, or may be user equipment (UE), a mobile station (MS), a mobile terminal, or the like. The terminal device may communicate with one or more core networks by using a radio access network (RAN). For example, the terminal device may be a mobile phone (or referred to as a "cellular" phone) or a computer with a mobile terminal. For example, the terminal device may also be a portable, pocket-sized, handheld, computer built-in, or in-vehicle mobile apparatus, which exchanges voice and/or data with the radio access network.

In the embodiments of the present invention, the base station may be an evolved base station (evolved node B, "eNB or e-NodeB" for short) in LTE, or may be another base station, or an access network device such as a relay. For the D2D communication, the base station may also be a device in the D2D communication. This is not limited in the present invention. For convenience of description, the following embodiments are described by using the eNB as an example.

Figure 3:
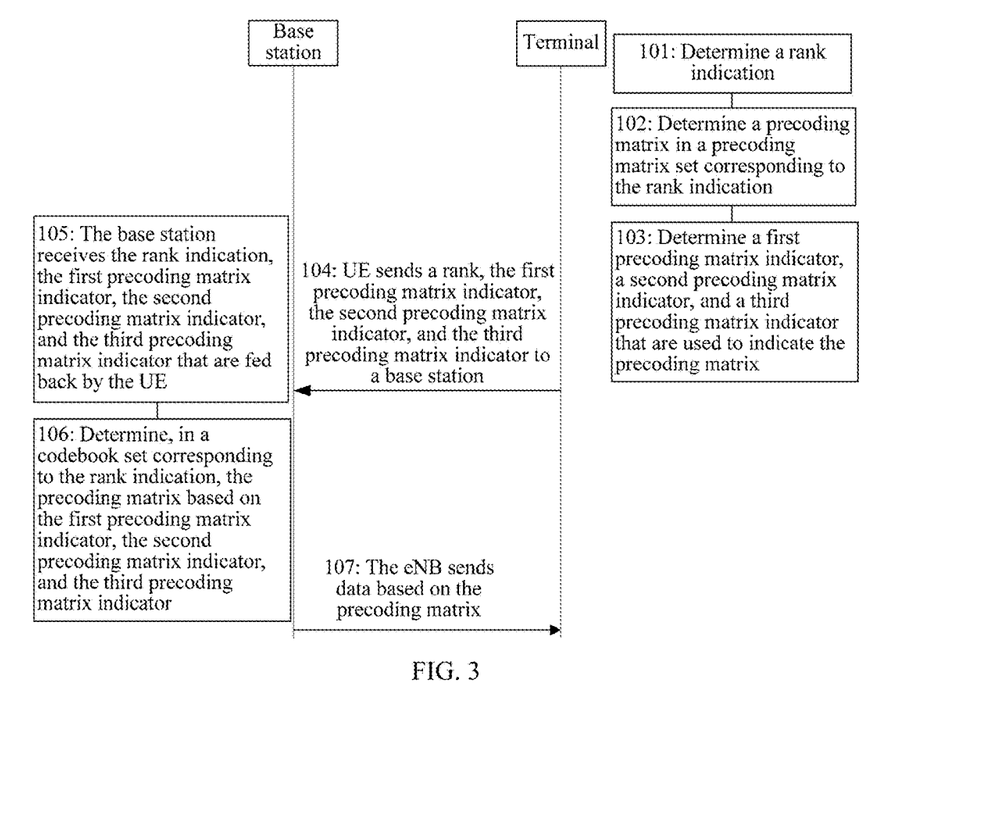
FIG. 3 is a schematic flowchart of a precoding matrix indicator feedback method according to an embodiment of the present invention.

FIG. 3 is a schematic flowchart of a precoding matrix determining method according to an embodiment of the present invention. As shown in FIG. 3, the method includes the following steps.

Step 101: A terminal device determines a rank indication.

In step 101, one rank value corresponds to one rank indication. The terminal device sends the rank indication to a base station, to indicate a quantity of downlink data streams that the terminal device expects to use for spatial multiplexing. For example, the rank value ranges from 1 to 8, and the rank indication is represented by three bits. When the rank indication is 000, it represents that a rank is 1, when the rank indication is 001, it represents that a rank is 2, and by analog. In conclusion, when a value is taken for a rank, there is a value of a rank indication corresponding to the rank.

Optionally, the terminal device may determine, based on information such as channel state information and the like, a quantity of data streams for spatial multiplexing, namely, a rank. Optionally, the base station sends a cell-specific reference signal (CRS) or a channel state information reference signal (CSI-RS) to the terminal device. The terminal device obtains downlink channel estimation and downlink interference estimation based on the CRS or the CSI-RS, and then determines, based on the downlink channel estimation and the downlink interference estimation, a quantity of transmitted downlink data streams that the terminal device expects to use for spatial multiplexing during downlink transmission, namely, a rank. It should be understood that the terminal device may determine the rank by using a method well-known to a person skilled in the art. For brevity, details are not described herein.

Step 102: Determine a precoding matrix in a precoding matrix set corresponding to the rank indication.

In step 102, the terminal device may determine, in a precoding matrix set corresponding to the rank indication and based on a reference signal such as the CSI-RS, a precoding matrix that the terminal device expects the base station eNB to use when the base station sends downlink data.

Step 103: Determine a first precoding matrix indicator, a second precoding matrix indicator, and a third precoding matrix indicator that are used to indicate the precoding matrix.

For the base station and the terminal device, there is a precoding matrix set for each rank (or each rank indication). In addition, in a case of a given rank, each precoding matrix is indicated by a first precoding matrix indicator, a second precoding matrix indicator, and a third precoding matrix indicator. There is a correspondence between a precoding matrix W and a first precoding matrix indicator, a second precoding matrix indicator, and a third precoding matrix indicator. For example, for a rank 1, the first precoding matrix indicator, the second precoding matrix indicator, and the third precoding matrix indicator each are represented by two bits, and there are a total of six bits to represent the three precoding matrix indicators. A precoding matrix set for the rank 1 includes $2^6=64$ precoding matrices. Each precoding matrix W corresponds to three precoding matrix indicators. For example, a value of the first precoding matrix indicator is 00, a value of the second precoding matrix indicator is 00, and a value of the third precoding matrix indicator is 00. This is equivalent to that a 6-bit precoding matrix indicator is 000000, and corresponds to one precoding matrix W. When the 6-bit precoding matrix indicator is 000001, the 6-bit precoding matrix indicator corresponds to another precoding matrix W. By analog, each precoding matrix W has a one-to-one correspondence with a precoding matrix indicator. This is equivalent to that when a value of a precoding matrix indicator is known, a corresponding precoding matrix is determined.

Step 104: The terminal device sends the rank indication, the first precoding matrix indicator, the second precoding matrix indicator, and the third precoding matrix indicator to a base station.

For example, on a physical uplink shared channel (PUSCH) or another channel, the terminal device sends, to the base station, the rank indication and a precoding matrix indicator (the first precoding matrix indicator, the second precoding matrix indicator, and the third precoding matrix indicator) that is used to indicate the precoding matrix. The base station may configure the terminal device to feed back the precoding matrix indicator on the PUSCH, or to feed back the precoding matrix indicator on a physical uplink control channel (PUCCH). For sending of the rank indication, the first precoding matrix indicator, the second precoding matrix indicator, and the third precoding matrix indicator by the terminal device, the rank indication may be sent before the three precoding matrix indicators are sent, or may be sent together with a part of the three precoding indicators, or may be sent together with all of the three precoding indicators. There is no sequence limit on sending of the rank indication and the precoding matrix indicators.

On a side of the base station, in step 105, the base station receives the rank indication and the precoding matrix indicators sent by the terminal device. For receiving of the rank indication, the first precoding matrix indicator, the second precoding matrix indicator, and the third precoding matrix indicator by the base station, the rank indication may be received before the three precoding matrix indicators are received, or may be received together with a part of the three precoding indicators, or may be received together with all of the three precoding indicators. There is no sequence limit on receiving of the rank indication and the precoding matrix indicators.

On the side of the base station, in step 106, in a codebook set corresponding to the rank indication, the precoding matrix is determined based on the first precoding matrix indicator, the second precoding matrix indicator, and the third precoding matrix indicator.

On the side of the base station, in step 107, the base station sends data based on the precoding matrix.

Optionally, in step 107, the base station sends data to the terminal device based on the precoding matrix determined in step 106. The base station may send the data to the terminal device on a physical downlink shared channel (PDSCH). When the data is sent, the precoding matrix used by the base station may be a precoding matrix corresponding to the precoding matrix indicators fed back by the terminal device, or another precoding matrix obtained after this precoding matrix is tranformed, for example, considering a zero-forcing algorithm at a transmitting end in multiuser MIMO.

W satisfies $W=W_1 \times W_2 \times W_3$, W is a matrix of $N_t$ rows and R columns, $N_t$ is a quantity of antenna ports, R is a rank value corresponding to the rank indication, $N_t$ is greater than or equal to R, $W_1$ is a matrix of $N_t$ rows and 2M columns, $W_2$ is a matrix of 2M rows and 2K columns, $W_3$ is a matrix of 2K rows and R columns, K is less than M, $N_t$, R, M, and K are all positive integers, M is greater than or equal to 2, $N_t$ is an even number, none of $W_1$, $W_2$, and $W_3$ is an identity matrix, and the 2M columns in $W_1$ include every column in $W_1 \times W_2$.

The precoding matrix W corresponds to a first precoding matrix indicator, a second precoding matrix indicator, and a third precoding matrix indicator, the first precoding matrix indicator corresponds to the first precoding matrix $W_1$, the second precoding matrix indicator corresponds to the second precoding matrix $W_2$, and the third precoding matrix indicator corresponds to the third precoding matrix $W_3$.

A set of columns in $W_1$ include every column in $W_1 \times W_2$. This represents that 2K column vectors are selected from the columns in $W_1$ as a result of $W_1 \times W_2$. In this way, a quantity of vectors in a set of to-be-selected vectors is reduced subsequently, thereby reducing calculation complexity of subsequent processing, and reducing a quantity of bits for feeding back a PMI for selection from candidate vectors. For example, $W_2$ is used to select a column vector from $W_1$, so that a quantity of selectable vector sets in $W_3$ is reduced, thereby reducing a quantity of bits required for feeding back $W_3$, and reducing calculation complexity.

In this embodiment of the present invention, in an optional implementation, each precoding matrix W in the precoding matrix set corresponding to the rank indication satisfies $W=W_1 \times W_2 \times W_3$.

Figure 4:
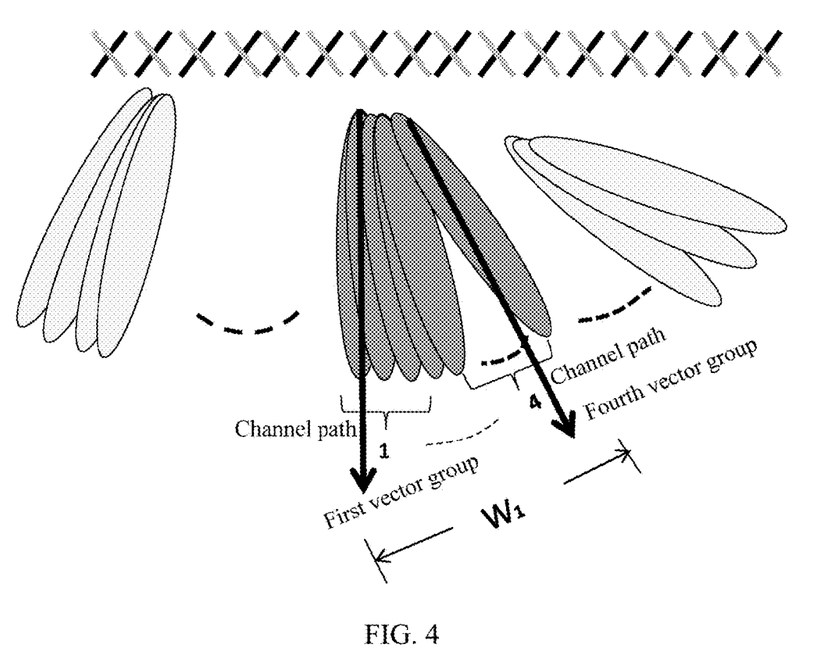
FIG. 4 is a schematic diagram of a correspondence between a multipath and a vector group.

As a quantity of antenna ports in a horizontal direction or a vertical direction increases, a formed beam becomes increasingly thinner, and it is even possible that one beam can cover only one path in a multipath channel. To capture more channel paths, that the terminal device selects and feeds back a plurality of vector groups for the base station to perform precoding is a good method. The vector group may include four or less vectors, for example, including two vectors. This method is described below by using an example in which there are 32 antenna ports with an antenna configuration $(N_1, N_2)=(16, 1)$ (as shown in FIG. 4). $N_1$ is a quantity of antenna ports in a polarization direction (45 degrees polarization or −45 degrees polarization) in a first direction, and $N_2$ is a quantity of antenna ports in a polarization direction in a second direction, where $N_1 \times N_2 = N_t/2$. The first direction may be a horizontal direction (or a vertical direction), and the second direction may be a vertical direction (or a horizontal direction).

In such an antenna form, an entire system bandwidth can be covered only when $W_1$ includes 16 vectors. For example, $$W_1 = \begin{bmatrix} X_1 & 0 \\ 0 & X_1 \end{bmatrix},$$

where $W_1$ is a block diagonal matrix, and two diagonal matrices are the same in $W_1$.

A quantity of vectors included in $W_1$ is a quantity of column vectors included in $X_1$, and is not a quantity of column vectors in $W_1$. A quantity of column vectors in $W_1$ is twice that of column vectors included in $X_1$. Usually, when a column vector in $X_1$ acts on an antenna port in a polarization direction, a beamforming function can be played. For example, each column in $X_1$ is a DFT (DFT, Discrete Fourier Transform, discrete Fourier transform) vector. Therefore, each column vector in $X_1$ may be considered as a direction vector or a beam vector.

The DFT vector refers to a T×1 precoding matrix, and the DFT vector v usually has a form shown by the following equation:

$$v = [1 \ e^{j2\pi m/N} \ \ldots \ e^{j2\pi(T-2)m/N} \ e^{j2\pi(T-1)m/N}]^T \quad (1)$$

where N and m are integers (N is not equal to 0), usually, $N=2^x$, x is a nonnegative integer, in other words, N is x powers of 2, and a $t^{th}$ element in the DFT vector v is $e^{j2\pi(t-1)m/N}$ (t=1, 2, ..., T). A superscript $^T$ represents matrix transposing. One diagonal block $X_1$ in $W_1$ is used for one polarization direction, and another diagonal block $X_1$ is used for another polarization direction. In an example of FIG. 4, antenna ports are arranged in a horizontal direction, and there are 16 antenna ports in one polarization direction. In this case, a quantity of rows in a matrix $X_1$ is 16. $W_1$ includes 16 vectors. This is equivalent to that $X_1$ has 16 columns. For example, each column in $X_1$ may be a DFT vector. Every four vectors form one vector group in $X_1$, and there are a total of four vector groups. For example, first to fourth columns in $X_1$ are used as a first vector group, fifth to eighth columns in $X_1$ are used as a second vector group, ninth to twelfth columns in $X_1$ are used as a third vector group, and thirteenth to sixteenth columns in $X_1$ are used as a fourth vector group.

The 16 vectors in W1 include a vector that the terminal device expects, within a relatively long time, the base station to use during precoding. However, actually, at a moment, not each vector in the vector group can be used. For example, for a terminal device, there are two strong paths from the terminal device to an antenna port of the base station. For the first strong path, when the base station uses a vector in the first vector group to perform precoding, a generated beam can aim to the first strong path in a direction of a main lobe. When the base station uses a vector in the fourth vector group to perform precoding, a generated beam can aim to the second strong path in the direction of the main lobe, as shown in FIG. 4.

In this case, the terminal device needs to send the first precoding matrix indicator (including 16 beam vectors) corresponding to $W_1$, and further feed back the second precoding matrix indicator of one or more vector groups selected from $W_1$. For example, in this example, the terminal device sends indicators of the first vector group and the fourth vector group to the base station.

When the terminal device learns, through measurement, that a channel rank is greater than 2, the terminal device needs to select, for each reported vector group, one or more vector groups orthogonal to the reported vector group, and send numbers of the one or more selected orthogonal vector groups to the base station. For example, a rank determined by the terminal device is 4, and vector groups reported by the terminal device are numbered as 1 and 4. Vectors included in the vector group numbered 1 are $[v_1 \ v_2 \ v_3 \ v_4]$, and vectors included in the vector group numbered 2 are $[v_5 \ v_6 \ v_7 \ v_8]$. In addition, the terminal further needs to send, to the base station, a vector group 1+k orthogonal to the vector group 1 and a vector group 4+k' orthogonal to the vector group 4, where vectors in the vector group numbered 1+k are $[v_{1+k}$ $v_{2+k}$ $v_{3+k}$ $v_{4+k}$], and vectors in the vector group numbered 1+k' are [$v_{5+k'}$ $v_{6+k'}$ $v_{7+k'}$ $v_{8+k'}$]. Based on the foregoing descriptions, $$W_1 \times W_2 = \begin{bmatrix} Y & 0 \\ 0 & Y \end{bmatrix}$$

and Y=[$v_1 \ldots v_8$ $v_{1+k} \ldots v_{4+k}$ $v_{5+k'} \ldots v_{8+k'}$] are obtained.

In this embodiment of the present invention, in an optional implementation, $W_2$ satisfies $$W_2 = \begin{bmatrix} X_2 & 0 \\ 0 & X_2 \end{bmatrix},$$

$X_2$ is a matrix of M rows and K columns, any column in $X_2$ is represented as $e_p$, $e_p$ is an M×1 column vector, a $p^{th}$ element in $$W_2 = \begin{bmatrix} X_2 & 0 \\ 0 & X_2 \end{bmatrix}$$

is 1, remaining elements are 0, and p is an integer from 1 to M.

In this embodiment of the present invention, in an optional implementation, $W_1$ satisfies $$W_1 = \begin{bmatrix} X_1 & 0 \\ 0 & X_1 \end{bmatrix},$$

$X_1$ is a matrix of $N_t/2$ rows and M columns, $X_1$=[$v_o \ldots v_{M-1}$], $v_o$ is a column vector including $N_t/2$ elements, and o is an integer from 0 to M−1.

Any column in $W_3$ is represented as $$\begin{bmatrix} e_l \\ \phi_n e_l \end{bmatrix},$$

$\phi_n$ is a complex number, $e_l$ is a K×1 column vector, an $l^{th}$ element in $e_l$ is 1, remaining elements are 0, and l is an integer from 1 to K.

For example, $W_1$ may be represented as $$W_1 = \begin{bmatrix} X_1 & 0 \\ 0 & X_1 \end{bmatrix},$$

$X_1$=[$k_k^1 \ldots v_{k+L_1-1}^1$]⊗[$v_l^2 \ldots v_{l+L_2-1}^2$], where $$v_{k+m}^1 = \begin{bmatrix} 1 & e^{j\frac{2\pi(k+m)}{N_1 O_1}} & \ldots & e^{j\frac{2\pi(N_1-1)(k+m)}{N_1 O_1}} \end{bmatrix}^T$$

represents an $m^{th}$ precoding vector in the first direction, m=0,1,...,$L_1$−1, $L_1$ represents a quantity of column vectors in the first direction in $X_1$ in $W_1$, $$v_{l+n}^2 = \begin{bmatrix} 1 & e^{j\frac{2\pi(l+n)}{N_2 O_2}} & \ldots & e^{j\frac{2\pi(N_2-1)(l+n)}{N_2 O_2}} \end{bmatrix}^T$$

represents an $n^{th}$ precoding vector in the second direction, n=0,1,...,$L_2$−1, $L_2$ represents a quantity of column vectors in the second direction in $X_1$ in $W_1$, and both $Q_1$ and $Q_2$ are generation parameters for generating the foregoing column vectors, and are positive integers. The first direction may be a horizontal direction (or a vertical direction), and the second direction may be a vertical direction (or a horizontal direction).

$W_2$ is used to further select K column vectors from vector groups in $W_1$, and may be represented as $$W_2 = \begin{bmatrix} X_2 & 0 \\ 0 & X_2 \end{bmatrix},$$

where $X_2$=[$e_i \ldots e_j$]$_{M \times K}$, $X_2$ is a matrix of M rows and K columns, $e_i$ represents an M×1 column vector, an $i^{th}$ element in $e_i$ is 1, remaining elements are 0, and M=$L_1 \times L_2$.

A function of $e_l$ in $W_3$ is to indicate a precoding vector, and a function of $\phi_n$ is to perform phase weighting on two groups of polarization antennas. Because first $N_t/2$ rows in the precoding matrix W correspond to a precoding weighting of an antenna port in one polarization direction, last $N_t/2$ rows correspond to a precoding weighting of an antenna port in another polarization direction.

In this embodiment of the present invention, in an optional implementation, a frequency domain resource corresponding to the first precoding matrix indicator is a downlink system bandwidth of the terminal device.

The downlink system bandwidth includes A first sub-bands and B second sub-bands, A and B are positive integers greater than 1, and A is less than or equal to B.

A frequency domain resource corresponding to the second precoding matrix indicator is one of the A first sub-bands, and a frequency domain resource corresponding to the third precoding matrix indicator is one of the B second sub-bands.

The downlink system bandwidth may be a downlink system bandwidth of a carrier. For example, if there is only one downlink carrier, the downlink system bandwidth is a downlink system bandwidth of the carrier. In a carrier aggregation scenario, if there are a plurality of downlink carriers, the downlink system bandwidth is a downlink system bandwidth of a carrier corresponding to a CSI fed back by the terminal device. For example, there are two downlink carriers: a carrier 1 and a carrier 2. If the terminal device currently feeds back a CSI of the carrier 1, the downlink system bandwidth is a downlink system bandwidth of the carrier 1.

Optionally, the terminal device reports a second precoding matrix indicator for each first sub-band, and reports a third precoding matrix indicator for each second sub-band.

In this embodiment of the present invention, in an optional implementation, a frequency domain resource of at least one of the A first sub-bands is the same as frequency domain resources of at least two of the B second sub-bands.

For example, the entire system bandwidth is divided into A first sub-bands, and each first sub-band includes S second sub-bands. The terminal device sends a second precoding matrix indicator to the base station for the entire system bandwidth. The terminal device sends a first precoding indicator for the system bandwidth, sends a second precoding matrix indicator for each first sub-band, and sends a third precoding matrix indicator for each second sub-band.

Figure 5:
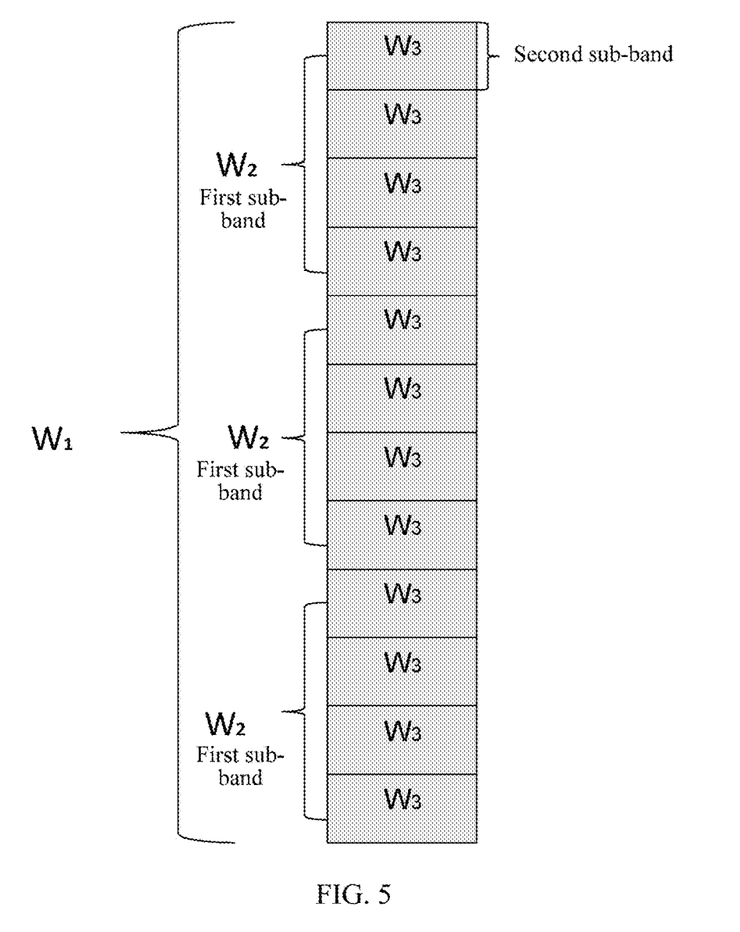
FIG. 5 is a schematic diagram of a first sub-band and a second sub-band.

The terminal device needs to select a second precoding matrix indicator for each first sub-band. The second precoding matrix indicator is used to select 2K column vectors from the first precoding matrix for the sub-band. In FIG. 5, each first sub-band has four second sub-bands.

For a rank (or rank indication), each precoding matrix W in a corresponding precoding matrix set may be represented as $W=W_1 \times W_2 \times W_3$. It is assumed that $W_1$ includes 16 beam vectors.

$$W_1 = \begin{bmatrix} X_1 & 0 \\ 0 & X_1 \end{bmatrix},$$

and X has 16 columns, which correspond to the 16 beam vectors. The following gives an example of different antenna port configurations and different $W_1$ and $W_2$.

For example, when an antenna port is configured as $(N_1, N_2)=(8, 2)$, where $N_1$ is a quantity of antenna ports in a horizontal direction, and $N_2$ is a quantity of antenna ports in a vertical direction, a diagonal matrix of $W_1$ is a Kronecker product of eight vectors in the horizontal direction and two vectors in the vertical direction, and there are a total of 16 beam vectors. When an antenna port is configured as $(N_1, N_2)=(4, 4)$, a beam vector in $W_1$ is a Kronecker product of four vectors in the horizontal direction and four vectors in the vertical direction, and there also are a total of 16 beam vectors. The vectors in $W_1$ are divided into several vector groups, and each vector group includes four or eight beam vectors.

Using $(N_1, N_2)=(8, 2)$ as an example, $W_1$ includes 16 beam vectors. The 16 beam vectors are numbered as 1, 2, . . . , and 16. Using eight beams as one beam vector group, and there are four overlapped beam vectors between every two neighboring beam vector groups. Therefore, the 16 beam vectors may be divided into three beam vector groups. The first beam vector group includes beam vectors numbered 1 to 8, the second beam vector group includes beam vectors numbered 5 to 12, and the third beam vector group includes beam vectors numbered 9 to 16. The terminal device indicates a selected beam vector group by the second precoding matrix indicator. This is equivalent to that $W_2$ is determined. In this way, for the third precoding indicator, three bits may be used to select a beam vector for precoding.

This may alternatively be that $W_1$ includes 16 beam vectors, which are divided into four groups, and each group includes four beam vectors. The first beam vector group includes beam vectors numbered 1 to 4, the second beam vector group includes beam vectors numbered 5 to 8, the third beam vector group includes beam vectors numbered 9 to 12, and the fourth beam vector group includes beam vectors numbered 13 to 16. There is no overlapped beam vector between neighboring groups. The terminal device indicates a selected beam vector group by the second precoding matrix indicator.

In this embodiment of the present invention, in an optional implementation, frequency domain resources corresponding to the first precoding matrix indicator, the second precoding matrix indicator, and the third precoding matrix indicator are downlink system bandwidths of the terminal device. This implementation corresponds to wideband feedback of a precoding matrix indicator. The wideband feedback of the precoding matrix indicator means that a frequency domain resource corresponding to a feedback precoding matrix indicator is an entire system bandwidth.

In this embodiment of the present invention, in an optional implementation, a transmission period of the first precoding matrix indicator is $P_1$, a transmission period of the second precoding matrix indicator is $P_2$, a transmission period of the third precoding matrix indicator is $P_3$, $P_1$ is greater than or equal to $P_2$, and $P_2$ is greater than or equal to $P_3$.

In this embodiment of the present invention, in an optional implementation, the transmission periods $P_1$, $P_2$, and $P_3$ are sent by the base station to the terminal device through RRC signaling.

Different transmission periods may be configured for different precoding matrix indicators, and are used to correspond to different features of a channel. Some precoding matrix indicators correspond to a part that is of the channel and that varies relatively fast over time, and some precoding matrix indicators correspond to a part that is of the channel and that varies relatively slowly over time. For example, the first precoding matrix indicator corresponds to a part that is of a channel and that varies most slowly over time, the second precoding matrix indicator corresponds to a part that is of the channel and that varies relatively slowly over time, and the third precoding matrix indicator corresponds to a part that is of the channel and that varies relatively fast over time. $P_1$, $P_2$, and $P_3$ are configured based on channel features, so as to reduce a quantity of bits for feeding back a PMI.

For example, in an LTE system, a length of one subframe is 1 millisecond, which is also a length of one transmission time interval (TTI). The TTI refers to a transmission length for independent decoding on a radio link.

The terminal device feeds back the precoding matrix indicator on a PUCCH. In a first feedback mode, a channel quality indication (CQI) and the third precoding matrix indicator are reported on the PUCCH in one subframe. The rank indication and the first precoding matrix indicator are reported on the PUCCH in one subframe.

A reporting period of the rank indication and the first precoding matrix indicator is $P_1$, a reporting period of the second precoding matrix indicator is $P_2$, and a reporting period of the channel quality indication and the third precoding matrix indicator is $P_3$, where $P_1=T_1P_2$, and $P_2=T_2P_3$. For example, $T_1=10$, and $T_2=4$.

In a second feedback mode of the PUCCH, the RI, a precoding type indication (PTI), and the first precoding matrix indicator are reported together, and there also are three reporting periods: $P_1$, $P_2$, and $P_3$.

At a reporting moment in the period $P_1$, the terminal device reports the RI, the PTI, and the first precoding matrix indicator on the PUCCH.

At a reporting moment in the period $P_2$, when PTI=0, the second precoding matrix indicator is reported. When PTI=1, a wideband CQI and wideband $W_3$ are reported. Wideband CQI reporting (wideband CQI feedback) means that a frequency domain resource corresponding to a feedback CQI is an entire system bandwidth.

At a reporting moment in the period $P_3$, when PTI=0, a wideband CQI and wideband $W_3$ are reported. When PTI=1, a third precoding matrix indicator corresponding to a sub-band CQI and sub-band $W_3$ are reported, where $P_1=T_1P_2$, and $P_2=T_2P_3$. For example, $T_1=8$, and $T_2=5$.

In this embodiment of the present invention, in an optional implementation, T column vectors in 2K column vectors in $W_2$ are indicated by the first precoding matrix indicator, T is an integer greater than or equal to 2, and T is less than K. 2K−T column vectors in $W_2$ except the T column vectors are indicated by the T column vectors and the second precoding matrix indicator.

For example, based on the first precoding matrix indicator, 16 beam vectors are determined as $[v_1 \ldots v_{16}]$, where $[v_1 \, v_2 \, v_3 \, v_4]$ are mandatory beam vectors. The second precoding matrix indicator is not required, and the second precoding matrix indicator is only used to indicate another vector group. For example, 1 is used to indicate a relationship between a second vector group and a first vector group. For example, $W_1 \times W_2$ may also be represented as $$W_1 W_2 = \begin{bmatrix} Y & 0 \\ 0 & Y \end{bmatrix},$$

where $Y=[v_1 \, v_2 \, v_3 \, v_4 \, v_{1+l} \ldots v_{4+l}]$, and Y is a matrix of $N_t/2$ rows and K columns. The second vector group may alternatively be directly indicated. For example, the first precoding matrix indicator corresponds to four vector groups, where the first vector group is a mandatory vector group. The second precoding matrix indicator indicates an another selected vector group. Compared with selecting a plurality of groups of vectors from $W_1$ by the second precoding matrix indicator, in the present invention, a vector group that needs to be indicated is reduced by using the second precoding matrix indicator, thereby reducing a quantity of bits in feedback. For example, the second precoding matrix changes from indicating two vector groups to indicating one vector group, reducing a quantity of bits required for indicating one vector group.

In this embodiment of the present invention, in an optional implementation, 2K column vectors in $W_2$ are indicated by a configuration parameter delivered by a base station and the second precoding matrix indicator.

For example, $W_1$ includes 16 beam vectors, which are divided into four groups, and each group includes four vectors. The first vector group includes beam vectors numbered 1 to 4, the second vector group includes beam vectors numbered 5 to 8, the third vector group includes beam vectors numbered 9 to 12, and the fourth vector group includes beam vectors numbered 13 to 16. As shown in this example, the terminal device sends indicators of the first vector group and the fourth vector group to the base station by using the second precoding matrix indicator, and there are a total of eight column vectors. To further reduce a quantity of bits of a precoding indicator sent by the terminal device, the selected vector group may further be downsampled based on the configuration parameter. For example, when the configuration parameter is 1, first to fourth vectors are selected from the eighth vectors. When the configuration parameter is 2, the first, second, fifth, and sixth column vectors are selected from the eighth vectors. When the configuration parameter is 3, the first, third, sixth, and eighth column vectors are selected from the eighth vectors. When the configuration parameter is 4, the first, fourth, fifth, and eighth column vectors are selected from the eighth vectors. For example, the terminal device indicates eight vectors, which are denoted as $v_1, v_2, \ldots,$ and $v_8$ by the second precoding matrix indicator. If no configuration parameter is used to downsample the selected vector groups, $$W_1 \times W_2 = \begin{bmatrix} Y & 0 \\ 0 & Y \end{bmatrix},$$

$Y=[v_1 \, v_2 \ldots v_8]$, including eight vectors. Further, $W_1 \times W_2$ includes eight beam vectors. If there is a configuration parameter used to downsample the selected vector groups, and the configuration parameter is 1, $$W_1 \times W_2 = \begin{bmatrix} Y & 0 \\ 0 & Y \end{bmatrix},$$

$Y=[v_1 \, v_2 \, v_3 \, v_4]$, including four vectors. Further, $W_1 \times W_2$ includes four beam vectors. Because the configuration parameter is configured by the base station, the configuration parameter is fixed after configuration, and therefore does not occupy a feedback bit of the terminal device. In this way, for the third precoding indicator, only two bits may be used to select a beam vector for precoding. If there is no configuration parameter, 3 bits need to be used to select a beam vector for precoding. Therefore, in this implementation, a quantity of bits for feeding back the third precoding indicator can be reduced.

Optionally, the configuration parameter may be sent by the base station to the terminal device through RRC signaling.

In this embodiment of the present invention, in an optional implementation, the configuration parameter is used to indicate a selectable column vector set of $W_1$, the selectable column vector set includes J column vectors, and J satisfies $2K<J<2M$.

For example, the first precoding indicator indicates that $W_1$ includes 16 beam vectors. Using four beams as one beam vector group, there may be four beam groups after division. Two of the beam vector groups are determined by using the configuration parameter. For example, the first and the third beam vector groups are determined by using the configuration parameter. Because each vector group has four beam vectors, a total of eight beam vectors are selected by using the configuration parameter. This is equivalent to that in this implementation, $J=8\times 2=16$. It is further determined, based on the second precoding indicator, whether to select the first beam vector group or the third beam vector group for subsequent processing. A quantity of bits for feeding back the second precoding indicator is reduced by using the configuration parameter.

In this embodiment of the present invention, in an optional implementation, $X_1$ in $W_1$ satisfies $X_1=[v_0^1 \ldots v_{M_1-1}^1]\otimes[v_0^2 \ldots v_{M_2-1}^2]$, where $v_m^1$ is a column vector including $N_1$ elements, $v_n^2$ is a column vector including $N_2$ elements, $N_1\times N_2=N_t/2$, $M_1\times M_2=M$, and $\otimes$ represents a Kronecker product.

In this embodiment of the present invention, in an optional implementation, $X_2$ in $W_2$ satisfies $X_2=X_3\otimes X_4$, where $X_3$ is a matrix of $M_1$ rows and $K_1$ columns, $X_4$ is a matrix of $M_2$ rows and $K_2$ columns, and $\otimes$ represents a Kronecker product.

Any column in $X_4$ is represented as $e_i$, $e_i$ is an $M_1\times 1$ column vector, an $i^{th}$ element in $e^i$ is 1, remaining elements are 0, a value of i is an integer from 1 to $M_1$.

Any column in $X_4$ is represented as $e_j$, $e_j$ is an $M_2\times 1$ column vector, a $j^{th}$ element in $e_j$ is 1, remaining elements are 0, a value of j is an integer from 1 to $M_2$.

$K_1\times K_2=K$, and $M_1\times M_2=M$.

In the foregoing embodiment, there may be no preference in order between step 102 and step 103, and determining in the two steps may be performed simultaneously. This is because when the precoding matrix that the terminal device expects the base station to use is determined, the corresponding precoding matrix indicator is determined.

Step 101 may be performed before steps 102 and 103. Alternatively, step 101 and steps 102 and 103 may be performed simultaneously.

For example, a received signal model of the UE is:

$$y = HWs + n \quad (2)$$

where y is a received signal vector, H is a channel matrix, W is a precoding matrix, $s$ is a transmitted symbol vector, and $n$ is interference plus noise.

The terminal device traverses all ranks and all precoding matrices corresponding to the ranks, and calculates a channel capacity obtained after precoding is performed on each precoding matrix. A channel capacity is obtained for each precoding matrix. The channel capacity may be a quantity of bits that can be correctly sent at the transmitting end. A precoding matrix corresponding to a maximum channel capacity and a rank corresponding to the precoding matrix are obtained. The terminal device sends, to the base station, a rank indication corresponding to the precoding matrix and a precoding matrix indicator corresponding to the precoding matrix.

When a rank is determined, for example, in a subframe, the terminal device needs to send a precoding matrix indicator. A rank indication has been sent before. In this case, the terminal device only needs to traverse a precoding matrix set corresponding to the rank indication. For example, a rank corresponding to the rank indication is 1, the terminal device needs to traverse only a precoding matrix set for which a rank is equal to 1, so as to obtain a precoding matrix allowing a maximum channel capacity; and sends a corresponding precoding matrix indicator to the base station.

When traversing a precoding matrix corresponding to a rank, the terminal device may obtain the precoding matrix by a precoding matrix indicator. For example, during precoding matrix indicator traversing, when a precoding matrix indicator is traversed, a precoding matrix is obtained based on the precoding matrix indicator, and a channel capacity is calculated based on the precoding matrix. Alternatively, a precoding matrix may be directly traversed. After a precoding matrix allowing a maximum channel capacity is selected, a precoding matrix indicator is obtained based on a correspondence between a precoding matrix and a precoding matrix indicator. The precoding matrix indicator is sent to the base station.

The method according to this embodiment of the present invention is described in detail in the foregoing with reference to FIG. 3. A terminal device and a base station according to embodiments of the present invention are described below with reference to FIG. 6 to FIG. 9.

Figure 6:
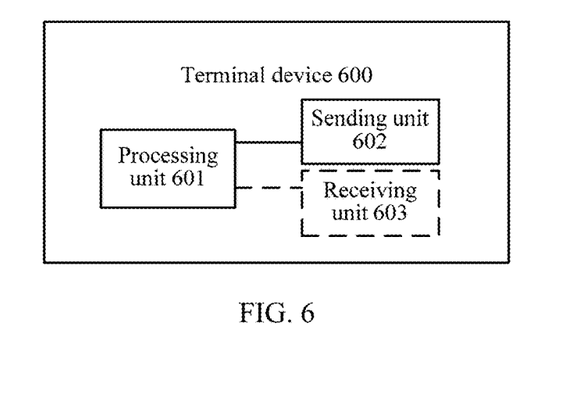
FIG. 6 is a schematic block diagram of a terminal device according to an embodiment of the present invention.

FIG. 6 is a schematic block diagram of a terminal device according to an embodiment of the present invention. As shown in FIG. 6, the terminal device 600 includes a processing unit 601. The processing unit 601 is configured to: determine a rank indication, and determine a precoding matrix W in a precoding matrix set corresponding to the rank indication. W satisfies $W = W_1 \times W_2 \times W_3$, W is a matrix of $N_t$ rows and R columns, $N_t$ is a quantity of antenna ports, R is a rank value corresponding to the rank indication, $N_t$ is greater than or equal to R. $W_1$ is a matrix of $N_t$ rows and 2M columns, $W_2$ is a matrix of 2M rows and 2K columns, $W_3$ is a matrix of 2K rows and R columns. K is less than M, $N_t$, R, M, and K are all positive integers, M is greater than or equal to 2, $N_t$ is an even number. None of $W_1$, $W_2$, and $W_3$ is an identity matrix, and the 2M columns in $W_1$ include every column in $W_1 \times W_2$.

The precoding matrix W corresponds to a first precoding matrix indicator, a second precoding matrix indicator, and a third precoding matrix indicator, the first precoding matrix indicator corresponds to the first precoding matrix $W_1$, the second precoding matrix indicator corresponds to the second precoding matrix $W_2$, and the third precoding matrix indicator corresponds to the third precoding matrix $W_3$.

The terminal device 600 includes a sending unit 602 which is configured to send the rank indication, the first precoding matrix indicator, the second precoding matrix indicator, and the third precoding matrix indicator.

The terminal device further includes a receiving unit 603, configured to receive a configuration parameter sent by a base station.

For further descriptions of the rank indication, the first precoding matrix indicator, the second precoding matrix indicator, the third precoding matrix indicator, and the precoding matrix W, refer to descriptions in the method embodiment of the present invention. For specific implementation of the processing unit of the terminal device, refer to specific implementation of the terminal device in the foregoing method embodiment.

Therefore, based on the terminal device sending the precoding matrix indicator in this embodiment of the present invention, a quantity of bits for feeding back the precoding matrix indicator is reduced while a system performance requirement is satisfied.

Figure 7:
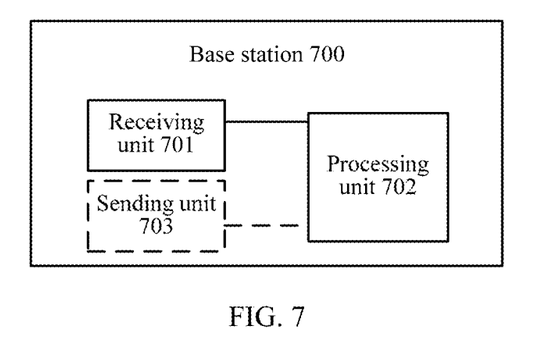
FIG. 7 is a schematic block diagram of a base station according to an embodiment of the present invention.

FIG. 7 is a schematic block diagram of a base station according to an embodiment of the present invention.

The base station 700 includes a receiving unit 701. The receiving unit 701 is configured to receive a rank indication, a first precoding matrix indicator, a second precoding matrix indicator, and a third precoding matrix indicator that are sent by a terminal device.

The base station 700 includes a processing unit 702 which is configured to determine, in a precoding matrix set corresponding to the rank indication, a precoding matrix W based on the first precoding matrix indicator, the second precoding matrix indicator, and the third precoding matrix indicator.

W satisfies $W = W_1 \times W_2 \times W_3$, W is a matrix of $N_t$ rows and R columns, $N_t$ is a quantity of antenna ports, R is a rank value corresponding to the rank indication, $N_t$ is greater than or equal to R, $W_1$ is a matrix of $N_t$ rows and 2M columns, $W_2$ is a matrix of 2M rows and 2K columns, $W_3$ is a matrix of 2K rows and R columns, K is less than M, $N_t$, R, M, and K are all positive integers, M is greater than or equal to 2, $N_t$ is an even number, none of $W_1$, $W_2$, and $W_3$ is an identity matrix, and the 2M columns in $W_1$ include every column in $W_1 \times W_2$.

The first precoding matrix indicator corresponds to the first precoding matrix $W_1$, the second precoding matrix indicator corresponds to the second precoding matrix $W_2$, and the third precoding matrix indicator corresponds to the third precoding matrix $W_3$.

The base station further includes a sending unit 703, configured to send a configuration parameter.

For further descriptions of the rank indication, the first precoding matrix indicator, the second precoding matrix indicator, the third precoding matrix indicator, and the precoding matrix W, refer to descriptions in the method embodiment of the present invention. For specific implementation of the processing unit of the base station, refer to specific implementation of the base station in the foregoing method embodiment.

Therefore, based on the base station receiving the precoding matrix indicator in this embodiment of the present invention, a quantity of bits of the received precoding matrix indicator is reduced while a system performance requirement is satisfied.

Figure 8:
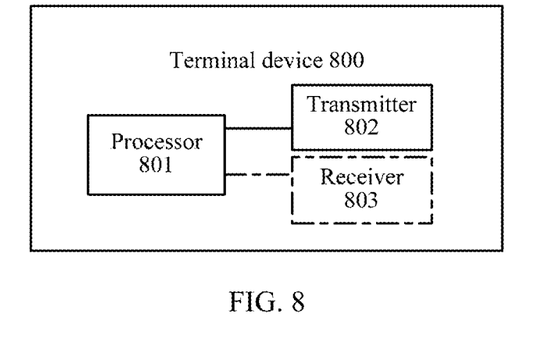
FIG. 8 is a schematic block diagram of a terminal device according to another embodiment of the present invention.
Figure 9:
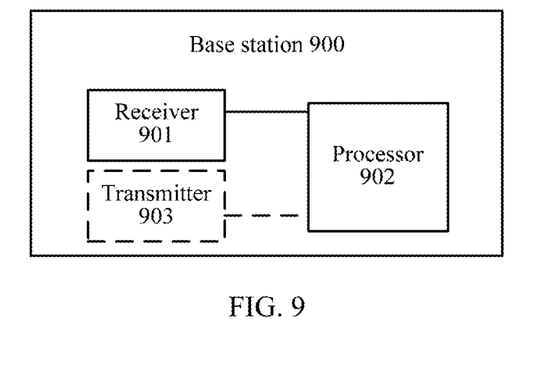
FIG. 9 is a schematic block diagram of a base station according to another embodiment of the present invention.

The processing unit may be a processor, the receiving unit may be a receiver, and sending unit may be a transmitter. A terminal device including a processor 801, a transmitter 802, and a receiver 803 is shown in FIG. 8. A base station including a processor 902, a transmitter 903, and a receiver 901 is shown in FIG. 9.

It should be understood that in the embodiments of the present invention, the processor 801/901 may be a central processing unit (Central Processing Unit, "CPU" for short), or the processor 801/901 may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor, or the processor may be any conventional processor or the like.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A method, comprising:
receiving, by a terminal device, a reference signal from a base station;
based on the received reference signal, determining, by the terminal device, a precoding matrix W in a precoding matrix set corresponding to a rank indication, wherein W satisfies $W=W_1 \times W_2 \times W_3$, W is a matrix of $N_t$ rows and R columns, $N_t$ is a quantity of antenna ports, R is a rank value corresponding to the rank indication, $N_t$ is an even number and $N_t$ is greater than or equal to R, wherein $W_1$ is a matrix of $N_t$ rows and 2M columns, $W_2$ is a matrix of 2M rows and 2K columns, $W_3$ is a matrix of 2K rows and R columns, K is less than M, wherein $N_t$, R, M, and K are all positive integers, M is greater than or equal to 2, none of $W_1$, $W_2$, and $W_3$ is an identity matrix, and the 2M columns in $W_1$ comprise every column in $W_1 \times W_2$, wherein a first precoding matrix indicator corresponds to the first precoding matrix $W_1$, a second precoding matrix indicator corresponds to the second precoding matrix $W_2$, and a third precoding matrix indicator corresponds to the third precoding matrix $W_3$;
sending, by the terminal device, the rank indication, the first precoding matrix indicator, the second precoding matrix indicator, and the third precoding matrix indicator to the base station; and
receiving, by the terminal device, data which is precoded using a precoding matrix determined by the base station based on the rank indication, the first precoding matrix indicator, the second precoding matrix indicator and the third precoding matrix indicator.

2. The method according to claim 1, wherein $W_2$ satisfies $$W_2 = \begin{bmatrix} X_2 & 0 \\ 0 & X_2 \end{bmatrix},$$

$X_2$ is a matrix of M rows and K columns, any column in $X_2$ is represented as $e_p$, $e_p$ is an M×1 column vector, a $p^{th}$ element in $e_p$ is 1, the remaining elements in $e_p$ are 0, and p is an integer ranged from 1 to M.

3. The method according to claim 1, wherein $W_1$ satisfies $$W_1 = \begin{bmatrix} X_1 & 0 \\ 0 & X_1 \end{bmatrix},$$

$X_1$ is a matrix of $N_t/2$ rows and M columns, $X_1 = [v_0 \ldots v_{m-1}]$, $v_o$ is a column vector comprising $N_t/2$ elements, and o is an integer ranged from 0 to M−1.

4. The method according to claim 1, wherein a frequency domain resource corresponding to the first precoding matrix indicator is a downlink system bandwidth of the terminal device, the downlink system bandwidth comprises A first sub-bands and B second sub-bands, A and B are positive integers greater than 1, and A is less than or equal to B; and
wherein a frequency domain resource corresponding to the second precoding matrix indicator is one of the A first sub-bands, and a frequency domain resource corresponding to the third precoding matrix indicator is one of the B second sub-bands.

5. The method according to claim 1, wherein a transmission period of the first precoding matrix indicator is $P_1$, a transmission period of the second precoding matrix indicator is $P_2$, a transmission period of the third precoding matrix indicator is $P_3$, $P_1$ is greater than or equal to $P_2$, and $P_2$ is greater than or equal to $P_3$.

6. The method according to claim 1, wherein T column vectors in 2K column vectors in $W_2$ are indicated by the first precoding matrix indicator, T is an integer greater than or equal to 2, and T is less than K; and
wherein 2K−T column vectors in $W_2$ except the T column vectors are indicated by the T column vectors and the second precoding matrix indicator.

7. The method according to claim 1, wherein 2K column vectors in $W_2$ are indicated by a configuration parameter delivered by the base station and the second precoding matrix indicator.

8. An apparatus, comprising:
a receiver, configured to receive a reference signal from a base station;
a processor, configured to: based on the received reference signal, determine a precoding matrix W in a precoding matrix set corresponding to a rank indication, wherein W satisfies $W=W_1 \times W_2 \times W_3$, W is a matrix of $N_t$ rows and R columns, $N_t$ is a quantity of antenna ports, R is a rank value corresponding to the rank indication, $N_t$ is an even number and $N_t$ is greater than or equal to R, wherein $W_1$ is a matrix of $N_t$ rows and 2M columns, $W_2$ is a matrix of 2M rows and 2K columns, $W_3$ is a matrix of 2K rows and R columns, K is less than M, wherein $N_t$, R, M, and K are all positive integers, M is greater than or equal to 2, none of $W_1$, $W_2$, and $W_3$ is an identity matrix, and the 2M columns in $W_1$ comprise every column in $W_1 \times W_2$, wherein a first precoding matrix indicator corresponds to the first precoding matrix $W_1$, a second precoding matrix indicator corresponds to the second precoding matrix $W_2$, and a third precoding matrix indicator corresponds to the third precoding matrix $W_3$; and a transmitter, configured to send the rank indication, the first precoding matrix indicator, the second precoding matrix indicator, and the third precoding matrix indicator to the base station, wherein the receiver is further configured to receive data which is precoded using a precoding matrix determined by the base station based on the rank indication, the first precoding matrix indicator, the second precoding matrix indicator and the third precoding matrix indicator.

9. The apparatus according to claim 8, wherein $W_2$ satisfies $$W_2 = \begin{bmatrix} X_2 & 0 \\ 0 & X_2 \end{bmatrix},$$

$X_2$ is a matrix of M rows and K columns, any column in $X_2$ is represented as $e_p$, $e_p$ is an M×1 column vector, a $p^{th}$ element in $e_p$ is 1, the remaining elements in $e_p$ are 0, and p is an integer ranged from 1 to M.

10. The apparatus according to claim 8, wherein $W_1$ satisfies $$W_1 = \begin{bmatrix} X_1 & 0 \\ 0 & X_1 \end{bmatrix},$$

$X_1$ is a matrix of $N_t/2$ rows and M columns, $X_1 = [v_0 \ldots v_{m-1}]$, $V_o$ is a column vector comprising $N_t/2$ elements, and o is an integer ranged from 0 to M−1.

11. The apparatus according to claim 8, wherein a frequency domain resource corresponding to the first precoding matrix indicator is a downlink system bandwidth of the apparatus, the downlink system bandwidth comprises A first sub-bands and B second sub-bands, A and B are positive integers greater than 1, and A is less than or equal to B; and wherein a frequency domain resource corresponding to the second precoding matrix indicator is one of the A first sub-bands, and a frequency domain resource corresponding to the third precoding matrix indicator is one of the B second sub-bands.

12. The apparatus according to claim 8, wherein a transmission period of the first precoding matrix indicator is $P_1$, a transmission period of the second precoding matrix indicator is $P_2$, a transmission period of the third precoding matrix indicator is $P_3$, $P_1$ is greater than or equal to $P_2$, and $P_2$ is greater than or equal to $P_3$.

13. The apparatus according to claim 8, wherein T column vectors in 2K column vectors in $W_2$ are indicated by the first precoding matrix indicator, T is an integer greater than or equal to 2, and T is less than K; and wherein 2K−T column vectors in $W_2$ except the T column vectors are indicated by the T column vectors and the second precoding matrix indicator.

14. The apparatus according to claim 8, wherein the receiver is configured to receive a configuration parameter from the base station; and wherein 2K column vectors in $W_2$ are indicated by the configuration parameter and the second precoding matrix indicator.

* * * * *